United States Patent
Moon et al.

(10) Patent No.: US 9,405,560 B2
(45) Date of Patent: Aug. 2, 2016

(54) METHOD AND APPARATUS FOR CONTROLLING ALARM OPERATION IN A TERMINAL

(71) Applicant: Samsung Electronics Co., Ltd, Gyeonggi-do (KR)

(72) Inventors: Kyung-Chun Moon, Gyeonggi-do (KR); Joon-Woo Kim, Gyeonggi-do (KR); Dae-Hyun Ji, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 13/954,567

(22) Filed: Jul. 30, 2013

(65) Prior Publication Data
US 2014/0032895 A1   Jan. 30, 2014

(30) Foreign Application Priority Data
Jul. 30, 2012 (KR) .......... 10-2012-0083066

(51) Int. Cl.
G06F 1/24 (2006.01)
G06F 9/445 (2006.01)
G04G 13/02 (2006.01)

(52) U.S. Cl.
CPC .......... *G06F 9/44505* (2013.01); *G04G 13/026* (2013.01)

(58) Field of Classification Search
CPC ................. G04G 13/02; G04B 23/06
USPC .................................. 713/320, 100
See application file for complete search history.

(56) References Cited

U.S. PATENT DOCUMENTS

| 8,023,361 | B2 | 9/2011 | Kokuryu | |
|---|---|---|---|---|
| 2007/0008827 | A1* | 1/2007 | Shin et al. | 368/109 |
| 2007/0268784 | A1* | 11/2007 | Xu | 368/73 |
| 2008/0239881 | A1* | 10/2008 | Kokuryu | 368/73 |
| 2011/0010654 | A1* | 1/2011 | Raymond | G06N 5/025 715/772 |

FOREIGN PATENT DOCUMENTS

KR   2003-0041567   5/2003

\* cited by examiner

*Primary Examiner* — Vincent Tran (57) ABSTRACT

According to one embodiment, a method and apparatus for controlling an alarm operation in a terminal, by which a plurality of alarms are terminated in the terminal. The method includes setting at least one of multiple alarm groups, each alarm group including multiple alarms, in which the setting of the at least one alarm groups includes automatically setting termination of the plurality of alarms associated with the alarm group to correspond to termination of the alarm group.

25 Claims, 6 Drawing Sheets

METHOD AND APPARATUS FOR CONTROLLING ALARM OPERATION IN A TERMINAL

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Jul. 30, 2012 and assigned Serial No. 10-2012-0083066, the entire disclosure of which is hereby incorporated by reference.

TECHNICAL FIELD OF THE INVENTION

The present invention generally relates to alarming devices, and more particularly, to a method and apparatus for controlling an alarm operation in a terminal.

BACKGROUND OF THE INVENTION

Generally, an alarm function provided in a terminal generates an alarm when alarm duration and interval are set and deactivated. In this case, if a snooze function is set, an alarm is generated for a preset number of times and at preset time intervals.

However, a user who desires more than the snooze function often sets a plurality of alarms for a single waking event.

When the plurality of alarms are set and activated for one waking event, if that event is achieved prior to generation of all of the alarms, the user has to separately deactivate the remaining alarms or terminate every alarm upon generation of the alarm.

SUMMARY OF THE INVENTION

To address the above-discussed deficiencies of the prior art, it is a primary object to provide a method and apparatus for controlling an alarm operation in a terminal.

The present invention also provides a method and apparatus for controlling an alarm operation in a terminal, by which termination of multiple alarms grouped in a group is automatically set to correspond to termination of the group.

According to an aspect of the present invention, a method for controlling an alarm operation in a terminal includes setting at least one alarm group, each including a plurality of alarms, in which the setting of the at least one alarm group includes automatically setting termination of the alarms to correspond to termination of the alarm group.

According to another aspect of the present invention, an apparatus for controlling an alarm operation in a terminal includes a controller configured to set at least one alarm group, each including a plurality of alarms, and automatically setting termination of the alarms to correspond to termination of the alarm group.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged alarm devices. Hereinafter, embodiments of the present invention will be described in detail with reference to the accompanying drawings. Throughout the drawings, like components will be referred to as like reference numerals.

A terminal according to the embodiments of the present invention includes a portable terminal and a fixed terminal. Herein, the portable terminal is a mobile electronic apparatus which is easy to carry, such as a video phone, a cellular phone, a smart phone, an International Mobile Telecommunication (IMT)-2000 terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an Electronic (E) book, a portable computer (e.g., a notebook, a tablet, and the like), a digital camera, or the like. The fixed terminal may be a desktop personal computer, and the like FIG. 1 illustrates an example terminal according to an embodiment of the present invention.

Figure 1:
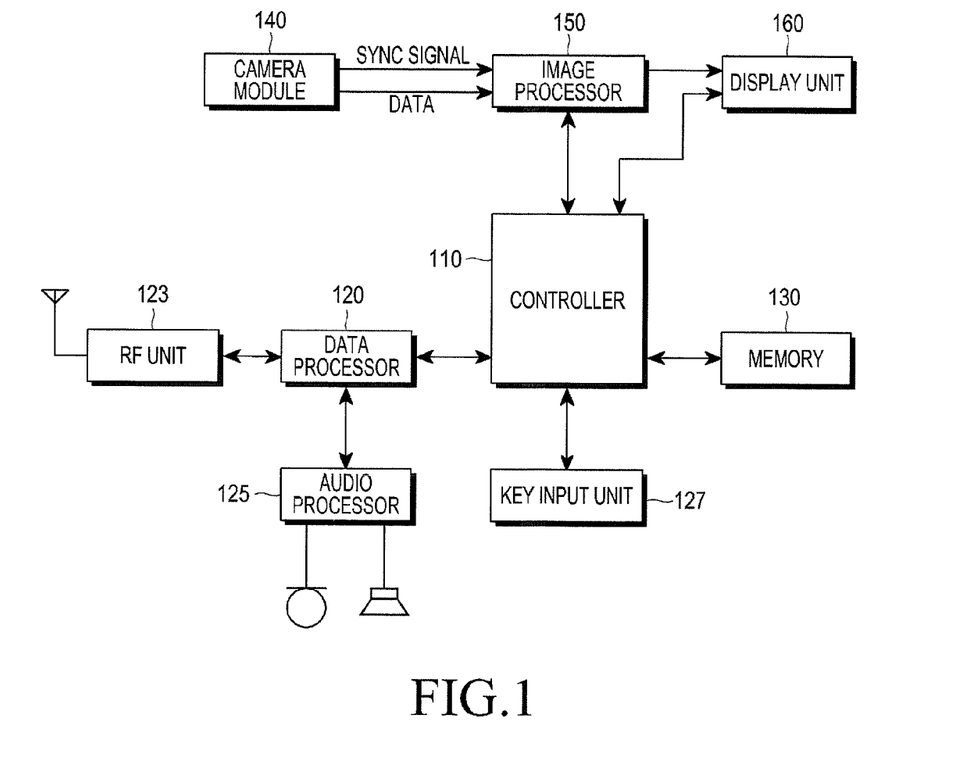
FIG. 1 illustrates an example terminal according to an embodiment of the present invention.

Referring to FIG. 1, a Radio Frequency (RF) unit 123 performs a radio communication function of the terminal. The RF unit 123 includes an RF transmitter for up-converting a frequency of a transmission signal and amplifying the transmitted signal and an RF receiver for low-noise amplifying a received signal and down-converting the frequency of the received signal. A data processor 120 includes a transmitter for encoding and modulating the transmission signal and a receiver for demodulating and decoding the received signal. That is, the data processor 120 may include a modem and a codec. Herein, the codec includes a data codec for processing packet data and an audio codec for processing an audio signal such as voice. An audio processor 125 reproduces a received audio signal being output from the audio codec of the data processor 120 or transmits a transmission audio signal generated from a microphone to the audio codec of the data processor 120.

A key input unit 127 includes keys for inputting numeric and character information and functional keys for setting various functions.

A memory 130 includes program and data memories. The program memory stores programs for controlling a general operation of the terminal, and programs for automatically setting termination of a plurality of alarms to correspond to termination of an alarm group including the plurality of alarms and terminating all alarms included in an alarm group including a generated alarm at a time according to user's selection, according to an embodiment of the present invention. The data memory also temporarily stores data generated during execution of the programs.

The memory 130 stores a plurality of alarm groups, each of which includes a plurality of alarms, according to an embodiment of the present invention.

The memory 130 also stores a plurality of alarm groups corresponding to at least one characters in an automatic alarm group setting mode according to an embodiment of the present invention.

A controller 110 functions to control the overall operation of the terminal.

According to an embodiment of the present invention, the controller 110 sets at least one of multiple alarm groups, each of which includes a plurality of alarms, and automatically sets termination of the plurality of alarms associated with each alarm group to correspond to termination of its associated alarm group.

According to an embodiment of the present invention, the controller 110 sets at least one alarm group, each of which includes a plurality of alarms, and upon generation of an alarm group termination, the controller 110 automatically terminates at least one alarms to be generated after the termination of the alarm group, together with termination of a currently generated alarm in the alarm group.

According to an embodiment of the present invention, the controller 110 also adds a new alarm to a corresponding alarm group among a plurality of existing alarm groups, or adds a new alarm to a newly added corresponding alarm group, if alarm group setting is selected in an alarm mode of the terminal. If an alarm sub-group of the corresponding alarm group is selected, the controller 110 determines whether to add a new alarm to the alarm sub-group, and determines whether to delete the alarm sub-group upon selection of alarm group termination as an operation corresponding to alarm generation.

According to an embodiment of the present invention, the controller 110 displays at least one set of alarms (or separate alarms) in the alarm mode of the terminal, and sets at least one alarm selected from among the displayed alarms as alarms of a corresponding alarm group, or alarms of an alarm sub-group including the corresponding alarm group.

According to an embodiment of the present invention, the controller 110 displays at least one separate alarm in the alarm mode of the terminal, and in the automatic alarm group setting mode, searches for information recorded in each of the displayed alarms, searches for an alarm group corresponding to at least one character included in the recorded information, and automatically sets each of the alarms as an alarm of the alarm group corresponding to the at least one character included in the information. If an alarm, which is not set as an alarm of the alarm group, exists among the displayed at least one separate alarms, the controller 110 manually sets that alarm as an alarm of the alarm group or sets the alarm as an alarm of a new alarm group.

According to an embodiment of the present invention, if alarm group termination is selected during generation of an alarm in the terminal, the controller 110 terminates the alarms to be generated after the alarm group termination among the alarms included in a corresponding alarm group, together with termination of the currently generated alarm.

According to an embodiment of the present invention, if alarm group termination is selected during generation of an alarm in the terminal, the controller 110 determines whether an alarm sub-group exists in an alarm group including the generated alarm, and if the alarm sub-group exists, the controller 110 checks a deletion setting for the alarm sub-group to terminate all alarms included in the alarm group except for alarms included in the alarm sub-group if deletion exception is set for the alarm sub-group.

All alarms except for alarms included in the alarm sub-group include the generated alarm and at least one alarm to be generated after the generation of the alarm group termination, among the alarms of the alarm group including the generated alarm except for alarms included in the alarm sub-group. Alarms preceding the generation of the alarm group termination may have been terminated because they have already been generated.

According to an embodiment of the present invention, the controller 110 terminates all alarms included in the alarm group including the generated alarm, if any alarm sub-group does not exist in the alarm group.

According to an embodiment of the present invention, the controller 110 terminates all alarms included in the alarm group including the generated alarm, if a termination exception for the alarm sub-group is not set. All alarms included in the alarm group may include the generated alarm and at least one alarm to be generated after the generation of the alarm group termination in the alarm group including the generated alarm. Alarms preceding the generation of the alarm group termination may have been terminated because they have already been generated.

According to an embodiment of the present invention, the controller 110 terminates the generated alarm upon selection of alarm termination during generation of the alarm, and upon selection of a snooze function during generation of the alarm, the controller 110 sets a snooze function of terminating the generated alarm and generating alarms a specified number of times at specified intervals.

According to an embodiment of the present invention, the controller 110 determines, among the terminated alarms, an alarm whose repetition period is set to occur one time, to a one-time alarm group, and releases alarm termination for an alarm whose repetition period is set to occur multiple times among the terminated alarms.

A camera module 140 captures an image, and may include a camera sensor for converting an optical signal of the captured image into an electrical signal, and a signal processor for converting an analog image signal of the image captured by the camera sensor into digital data. Herein, it is assumed that the camera sensor is a Charge Coupled Device (CCD) sensor or a Complementary Metal Oxide Semiconductor (CMOS) sensor, and the signal processor may be implemented as a Digital Signal Processor (DSP). In addition, the camera sensor and the signal processor may be implemented as one piece or separately.

The image processor 150 performs Image Signal Processing (ISP) to display an image signal output from the camera module 140 on a display unit 160. The ISP executes functions such as gamma correction, interpolation, color space conversion, image effect, image scale, Auto White Balance (AWB), Auto Exposure (AE) and Auto Focus (AF). Thus, the image processor 150 processes the image signal output from the camera module 140 in the unit of a frame, and outputs frame image data adaptively to the features and size of the display unit 160. The image processor 150 includes an image codec, and compresses the frame image data displayed on the display unit 160 in a preset manner or restores the compressed frame image data to the original frame image data. Herein, the image codec may be Joint Picture Experts Group (JPEG) codec, Moving Picture Experts Group 4 (MPEG4) codec, or Wavelet codec. It is assumed that the image processor 150 has an on screen display (OSD) function. The image processor 150 may output OSD data according to the displayed picture size under the control of the controller 110.

The display unit 160 displays an image signal output from the image processor 150 on the screen and displays user data output from the controller 110. Herein, the display unit 160 may be a Liquid Crystal Display (LCD), and in this case, the display unit 160 may include an LCD controller, a memory capable of storing image data, an LCD element, and so on. When the LCD is implemented with a touch screen, it may also serve as an input unit, and in this case, keys such as the key input unit 127 may be displayed on the display unit 160.

According to an embodiment of the present invention, the display unit 160 also displays types of alarm termination a user can select, such as, group alarm termination, alarm termination, and snooze, when an alarm is generated.

A process of controlling an alarm operation in a terminal will be described in detail with reference to FIGS. 2 through 5.

Figure 2:
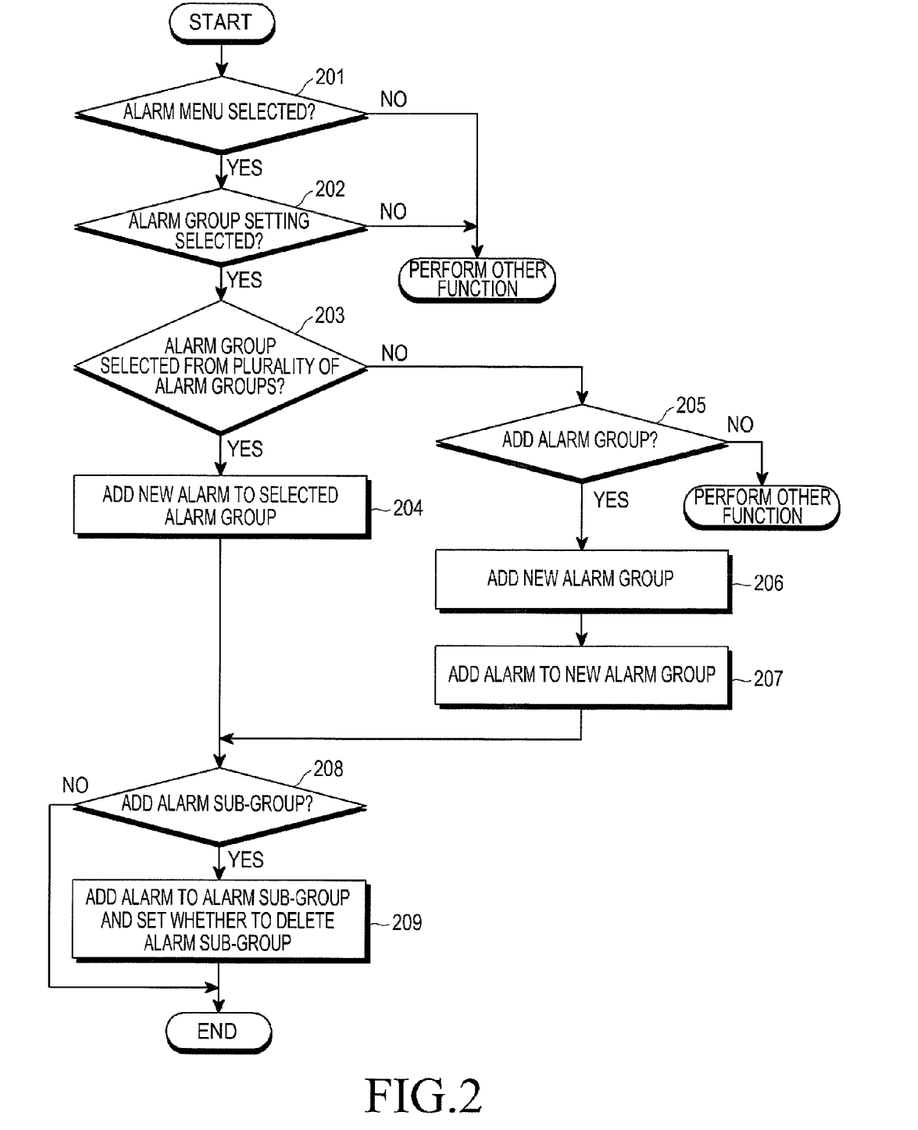
FIG. 2 illustrates an example process of setting an alarm group in a terminal according to a first embodiment of the present invention.
Figure 3:
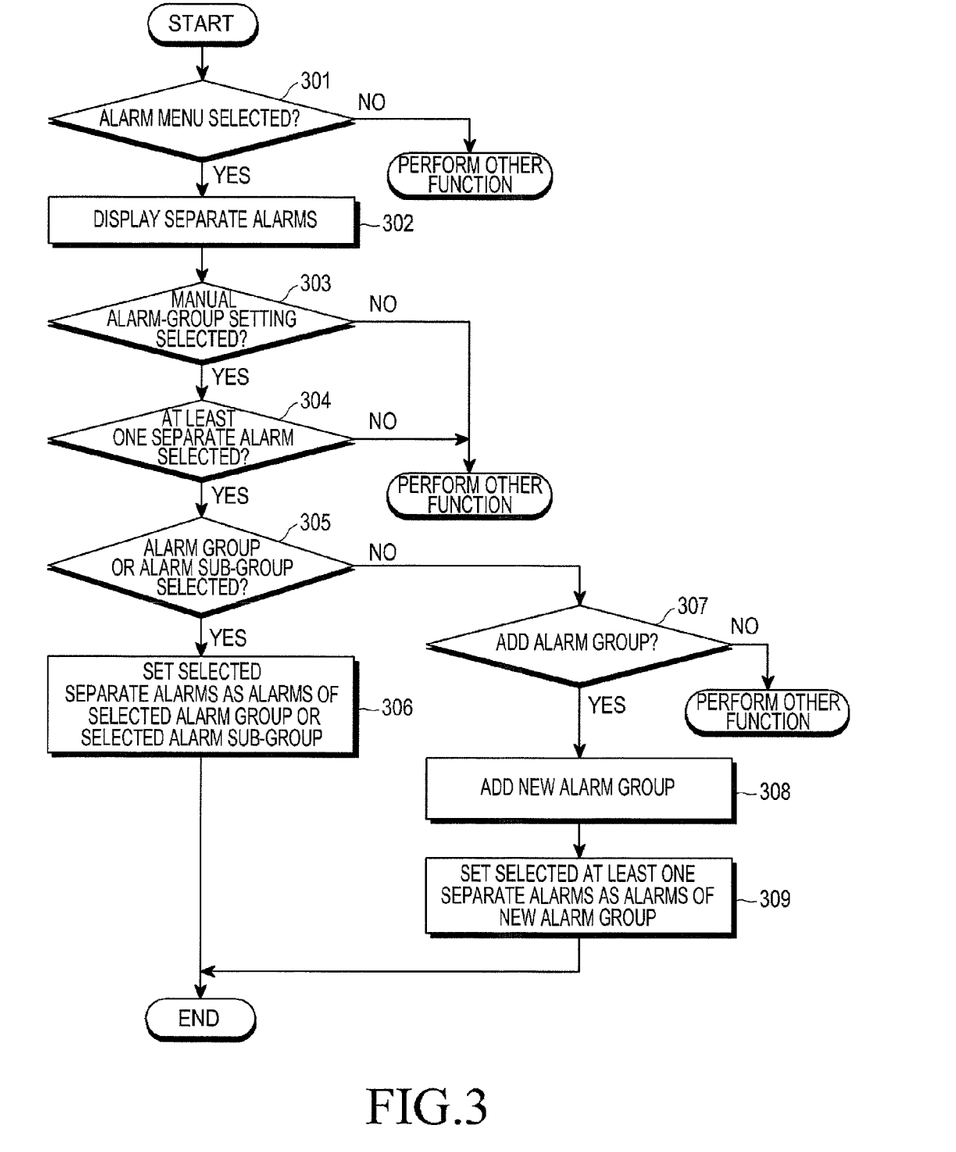
FIG. 3 illustrates an example process of setting an alarm group in a terminal according to a second embodiment of the present invention.
Figure 4:
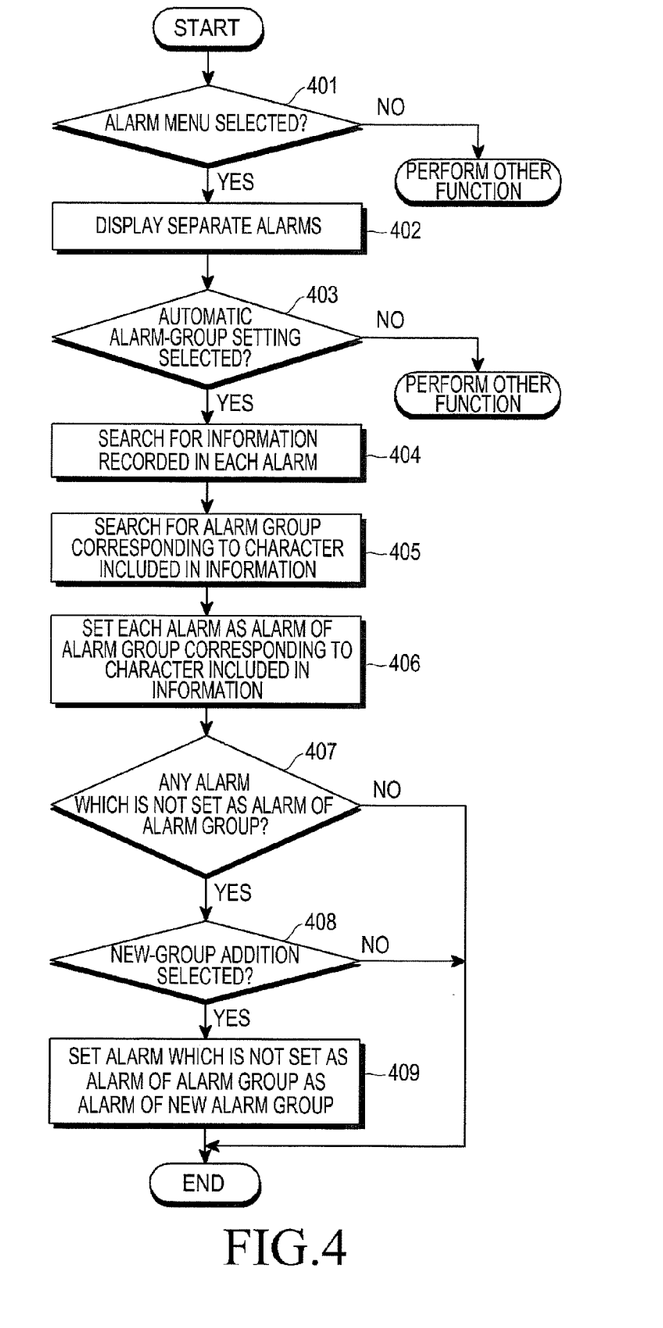
FIG. 4 illustrates an example process of setting an alarm group in a terminal according to a third embodiment of the present invention.

FIG. 2 illustrates an example process of setting an alarm group in the terminal according to a first embodiment of the present invention, FIG. 3 illustrates an example process of setting an alarm group in the terminal according to a second embodiment of the present invention, and FIG. 4 illustrates an example process of setting an alarm group in the terminal according to a third embodiment of the present invention. In FIGS. 2 through 4, operations for automatically setting termination of a plurality of alarms included in a corresponding alarm group to correspond to termination of the alarm group are described in detail. Hereinafter, the embodiments of the present invention will be described in detail also with reference to FIG. 1.

As to an operation of setting an alarm group in FIG. 2, upon selection of an alarm menu in the terminal, the controller 110 senses the selection in step 201 and switches to an alarm mode. If alarm group setting is selected in the alarm mode, the controller 110 senses the selection in step 202 and switches to an alarm group setting mode. In the alarm group setting mode, the controller 110 displays a plurality of alarm groups provided by default in the terminal or previously added by the user. If the user selects a corresponding alarm group from among the plurality of alarm groups, the controller 110 senses the selection in step 203, and adds an alarm newly set by the user to the selected alarm group in step 204.

For example, if the user sets at least one alarm after selecting an alarm group used for morning wakeup from among the plurality of alarm groups, the set alarm is added as an alarm of the alarm group used for the morning wakeup.

Alternatively, if the alarm group addition is selected to add a new alarm group in the alarm group setting mode, the controller 110 senses the selection in step 205 and adds a new alarm group used for any suitable purpose inputted by the user in step 206.

If a new alarm is set after the new alarm group is selected, the controller 110 adds the new alarm as an alarm of the new alarm group in step 207.

If alarm sub-group addition is selected during addition of the alarm to the corresponding alarm group in the alarm group setting mode, the controller 110 senses the selection in step 208, and adds a new alarm in the alarm sub-group as an alarm of the alarm sub-group and sets whether to delete the alarm sub-group upon selection of alarm group termination as an operation corresponding to alarm generation in step 209.

Alternatively, since an existing alarm group may include at least one alarm sub-group, an alarm sub-group among multiple alarm sub-groups may be selected to add a new alarm thereto.

One alarm group may include at least one alarm sub-group, and the alarm sub-group may be deleted or excluded from the termination according to setting of whether to delete the alarm sub-group, when alarm group termination for a corresponding alarm group including the alarm sub-group is selected.

For example, among multiple alarms that are set for the same purpose, an alarm which should not be deleted or an alarm whose repetition period is set to occur one time to be generated on a particular date may be set as an alarm of the alarm sub-group, and a termination exception may be set for the alarm sub-group, thereby preventing such an alarm from being terminated as an alarm of a corresponding alarm group.

As to an operation of setting an alarm group in FIG. 3, upon selection of the alarm menu in the terminal, the controller 110 senses the selection in step 301 and switches to an alarm mode, and continues processing at step 302 in which separately set alarms (or separate alarms) exist, they are displayed on the display unit 160 in the alarm mode.

If manual alarm group setting is selected during display of the separate alarms, the controller 110 senses the selection in step 303 and switches to a manual alarm group setting mode. If at least one separate alarm is selected from among the displayed separate alarms in the manual alarm group setting mode, the controller 110 senses the selection in step 304 and displays a plurality of existing alarm groups. At this time, alarm sub-groups included in each alarm group may also be displayed together.

Thus, if a corresponding alarm group or a corresponding alarm sub-group is selected from among the plurality of alarm groups, the controller 110 senses the selection in step 305, and sets the selected separate alarms as alarms of the selected corresponding alarm group or corresponding alarm sub-group in step 306.

If a new alarm group addition is selected after selection of the separate alarms from among the displayed separate alarms in the manual alarm group setting mode, the controller 110 adds a new alarm group having a purpose inputted by the user in step 308. The controller 110 sets the selected at least one separate alarms as alarms of the new alarm group in step 309.

As to an operation of setting an alarm group in FIG. 4, upon selection of the alarm menu in the terminal, the controller 110 senses the selection in step 401 and switches to the alarm mode, and goes to step 402 in which if separate alarms exist, the separate alarms are displayed on the display unit 160 in the alarm mode.

If automatic alarm group setting is selected during display of the separate alarms, the controller 110 senses the selection in step 403 and switches to an automatic alarm group setting mode. The controller 110 searches for information recorded in each of the displayed separate alarms in step 404, and searches in the plurality of alarm groups stored in the memory 130 for an alarm group corresponding to at least one character included in the searched information in step 405.

The controller 110 sets each of the displayed separate alarms as an alarm of an alarm group corresponding to the at least one character in step 406. At this time, according to user's selection, the separate alarms of the alarm group may be moved to the alarm group and thus may not be displayed as the separate alarms.

However, if an alarm which is not set as an alarm of an alarm group exists among the displayed separate alarms, the controller 110 senses their existence in step 407 and displays a message indicating existence of the alarm which is not set as an alarm of an alarm group. If new group addition is selected during display of the message, the controller 110 senses the selection in step 408, and adds a new alarm group having a purpose inputted by the user and sets the alarm which is not set as an alarm of the alarm group as an alarm of the new alarm group in step 409.

Alternatively, if manual alarm group setting is selected by the user during display of the message, the user may directly set the alarm which is not set as an alarm of the alarm group as an alarm of a corresponding alarm group.

For example, when the user sets an alarm function, may record information associated with an alarm. Therefore, in the automatic alarm group setting mode, information recorded in a separate alarm is searched, and for example, if information "Wakeup Time" is recorded in a particular separate alarm, the controller 110 may search for an alarm group corresponding to characters "Wakeup" among a plurality of alarm groups stored in the memory 130. Thus, the particular separate alarm may be automatically set as an alarm of the alarm group corresponding to the characters "Wakeup". Therefore, each of the plurality of alarm groups stored in the memory 130 has one purpose, but may include a plurality of corresponding characters for one purpose. For example, an alarm group having a purpose of a morning call may correspond to a plurality of characters such as "Wakeup", "Morning", and the like, and such a configuration may be edited according to a user's setting.

A plurality of alarms grouped in an alarm group as shown in FIGS. 2 through 4 may be automatically set such that upon alarm termination during sequential generation of alarms, at least one alarm, which is to be generated after the generation of the alarm group termination, are also terminated together with a currently generated alarm.

Figure 5A:
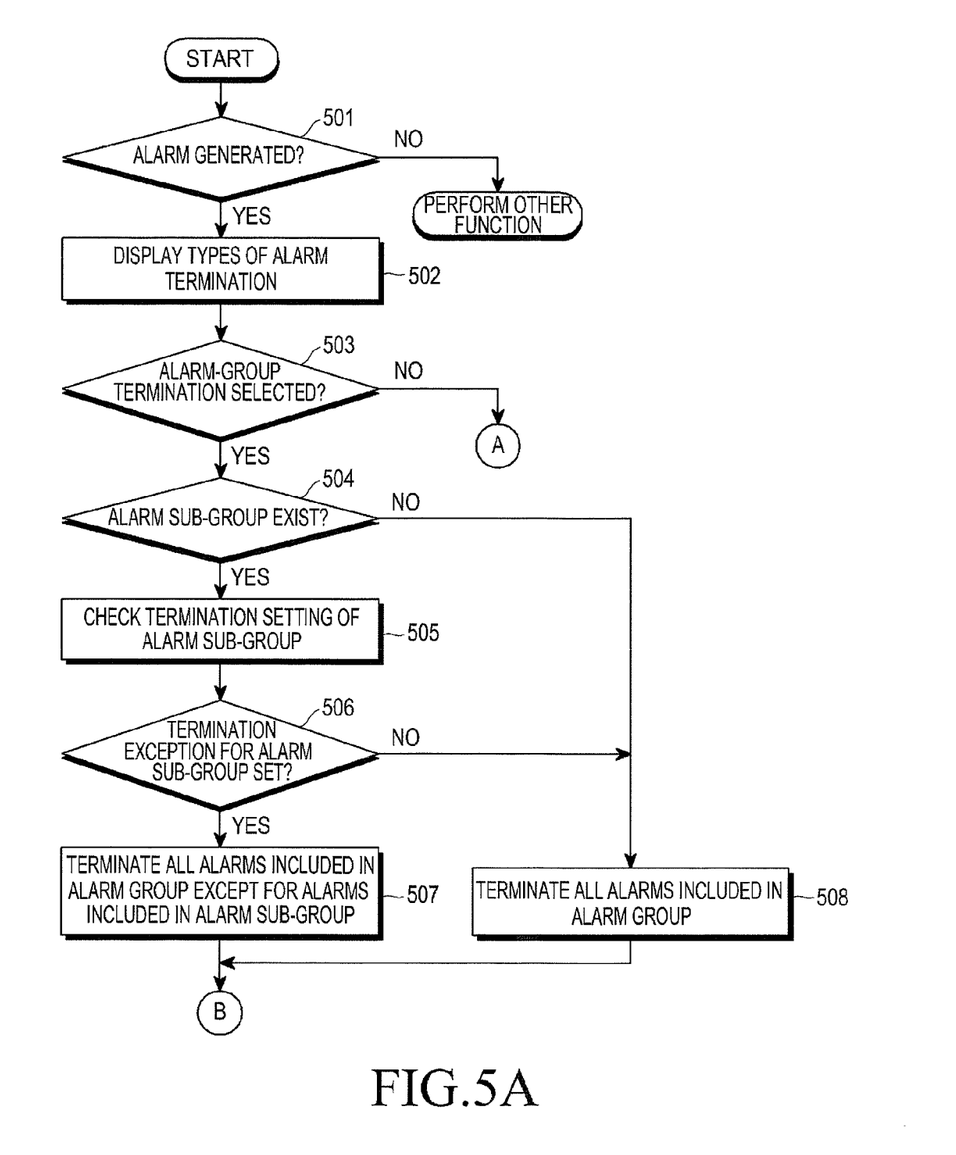
FIGS. 5A and 5B illustrate an example process of terminating an alarm group in a terminal according to an embodiment of the present invention.
Figure 5B:
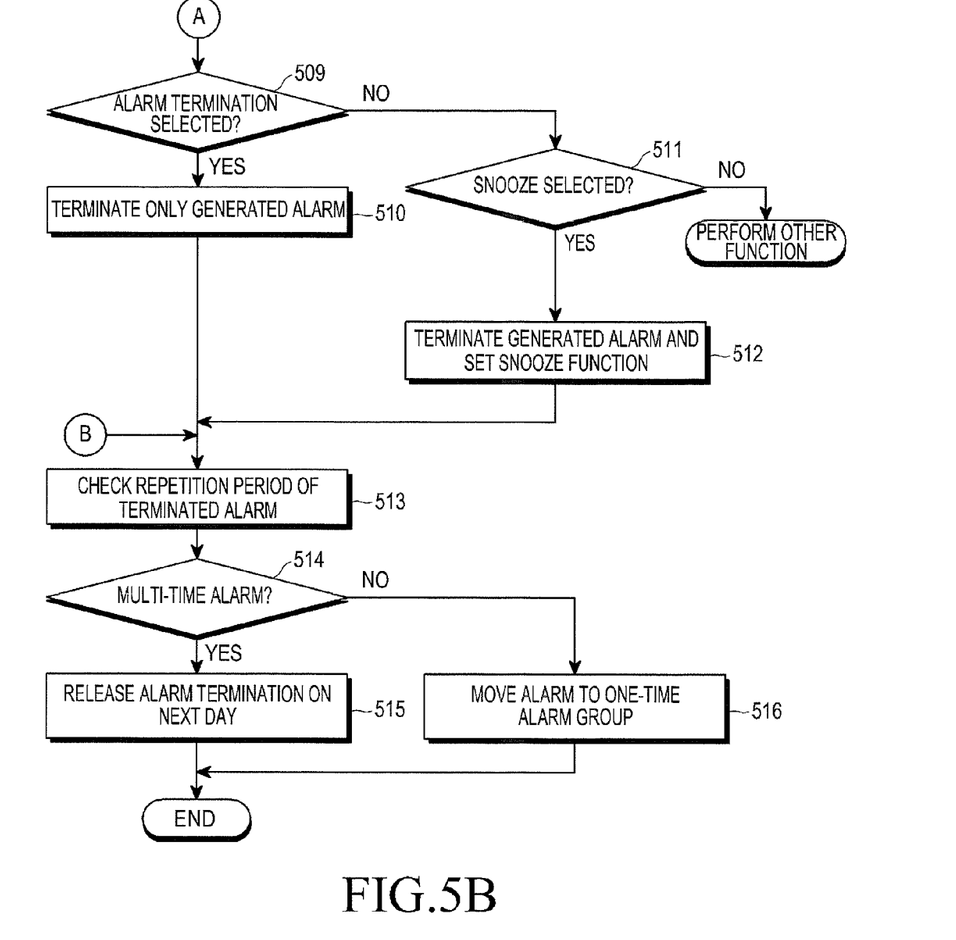

After an alarm group is set in the terminal as shown in FIGS. 2 through 4, an alarm generated in the terminal is terminated as shown in FIGS. 5A and 5B.

FIGS. 5A and 5B illustrate an example process of terminating an alarm group in the terminal according to an embodiment of the present invention.

Hereinafter, an embodiment of the present invention will be described in detail also with reference to FIG. 1.

Referring to FIGS. 5A and 5B, upon generation of an alarm that has been set in the terminal, the controller 110 senses the generation in step 501, and displays types of alarm termination for terminating the generated alarm in step 502.

Types of alarm termination may include "alarm-group termination", "alarm termination", and "snooze". The "alarm-group termination" may terminate all alarms of an alarm group including the generated alarm at a time; "alarm termination" terminates only the generated alarm; and "snooze" terminates the generated alarm and generates alarms repetitively a specified number of times at specified intervals.

Therefore, upon generation of the alarm, the controller 110 displays the types of alarm termination including "alarm-group termination" if determining that the generated alarm is set as an alarm of a particular alarm group, and displays the types of alarm termination without "alarm-group termination" if determining that the generated alarm is not set as an alarm of a particular alarm group.

Upon generation of the alarm, the controller 110 displays the types of alarm termination including "snooze" if determining that the snooze function is not set in the generated alarm, and displays the types of alarm termination without "snooze" if determining that the snooze function is set in the generated alarm.

If "alarm-group termination" is selected from among the types of alarm termination displayed during generation of the alarm, the controller 110 senses the selection in step 503 and determines whether an alarm sub-group exists in the alarm group including the generated alarm.

If the alarm sub-group exists in the alarm group including the generated alarm, the controller 110 senses the sub-group in step 504 and checks termination setting for the alarm sub-group in step 505.

If a termination exception for the alarm sub-group is set, the controller 110 senses the exception in step 506 and terminates all alarms of the alarm group including the generated alarm except for alarms included in the alarm sub-group in step 507.

For example, if alarm sub-groups "AM 05:00 Alarm", "AM 05:10 Alarm", "AM 05:20 Alarm", "AM 05:30 Alarm", and "Morning Wakeup-1" are included in an alarm group being set for the purpose "Morning Wakeup", upon generation of the "AM 05:10" alarm and selection of "Alarm-Group Termination", the "AM 05:20" alarm and the "AM 05:30" alarm to be generated are terminated at a time together with the "AM 05:10" alarm. Since the "AM 05:00" alarm has already been generated, it may have already been terminated. However, if the user releases termination of the "AM 05:00" alarm, termination or termination exception for the "AM 05:00" alarm may be performed according to user's setting.

If, however, a termination exception is not set for the alarm sub-group, the controller 110 senses the setting in step 506 and terminates all alarms of the alarm group including the generated alarm at a time in step 508.

For example, the alarm sub-groups "AM 05:00 Alarm", "AM 05:10 Alarm", "AM 05:20 Alarm", "AM 05:30 Alarm", and "Morning Wakeup-1" are included in the alarm group set for the purpose "Morning Wakeup", upon generation of the "AM 05:10" alarm and selection of "Alarm-Group Termination", alarms of the alarm sub-groups "AM 05:20 Alarm", "AM 05:30 Alarm", and "Morning Wakeup-1" to be generated are terminated at a time together with the "AM 05:10" alarm.

Upon selection of "Alarm Termination" from among the types of alarm termination displayed during the generation of the alarm, the controller 110 senses the selection in step 503 and terminates only the generated alarm in step 510.

Upon selection of "Snooze" from among the types of alarm termination displayed during the generation of the alarm, the controller 110 senses the selection in step 511, and sets a snooze function of terminating only the generated alarm and generating alarms for a specified number of times at specified intervals in step 512. The snooze function setting of step 512 may be performed such that the specified intervals and the specified number of times are set by the user or specified intervals and a specified number of times which are set by default may be automatically applied.

After completion of the termination of the generated alarm in steps 503 through 512, the controller 110 determines a repetition period set for the terminated alarms in step 513. If the alarm is terminated by "Alarm-Group Termination", the terminated alarms includes not only the alarm generated in step 501, but also alarms of an alarm group including the alarm generated in step 501.

If an alarm whose repetition period is set to occur multiple times exists among the terminated alarms as a result of the determination, the controller 110 senses the existence in step 514, and releases alarm termination for the alarm whose repetition period is set to occur multiple times on the next day in step 515.

For example, if the alarm's repetition period is set such that the alarm is repeated every Monday to Friday at "AM 05:00", "AM 05:30", and "AM 06:00", alarm termination is released such that even when an alarm is generated at AM 05:00 on Monday and all alarms (AM 05:00, AM 05:30, and AM 06:00 alarms) of an alarm group are terminated at a time by selection of "Alarm-Group Termination", alarms are generated at AM 05:00, AM 05:30, and AM 06:00 on the next day, Tuesday.

Alternatively, as a result of determining that a repetition period set for the terminated alarms, if an alarm whose repetition period is set to occur one time exists among the terminated alarms, the controller 110 determines the repetition period in step 514 and moves the alarm whose repetition period is set to occur one time to a one-time alarm group in step 516.

Generally, an alarm being set as a one-time alarm, after being generated, is displayed in a deactivated state unless deleted by the user. Therefore, if the alarm being set as a one-time alarm is generated, such an alarm is moved to a particular alarm group, that is, the one-time alarm group, such that it may be automatically removed after an elapse of a specified time or, together with other alarms of the one-time alarm group, may be deleted at a time by the user.

By providing a method and apparatus for controlling an alarm operation in a terminal according to the present invention, multiple alarms may be terminated at a time to allow a user to more efficiently use the alarms.

The apparatus and method for controlling an alarm operation in a terminal according to the present invention can be embodied as a computer-readable code on a computer-readable recording medium. The computer-readable recording medium is any data storage device that can store data which can be thereafter read by a computer system. Examples of computer-readable recording media include read-only memory (ROM), random-access memory (RAM), optical disks, magnetic tapes, floppy disks, hard disks, non-volatile memories, and the like, and carrier waves (e.g., transmission through the Internet). The computer-readable recording medium can also be distributed over network-coupled computer systems so that the computer-readable code is stored and executed in a decentralized fashion.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling an alarm operation in a terminal, the method comprising:
   setting, using one or more processors in the terminal, at least one of a plurality of alarm groups, each alarm group comprising a plurality of alarms and setting termination of the plurality of alarms to correspond to termination of the alarm group;
   when the alarm group termination is selected during generation of an alarm in the terminal, determining, using the one or more processors in the terminal, whether an alarm sub-group exists in an alarm group including the generated alarm; and
   when the alarm sub-group does not exist in the alarm group, terminating, using the one or more processors in the terminal, all alarms of an alarm group including the generated alarm.

2. The method of claim 1, wherein the setting of the at least one alarm groups comprises automatically setting termination of at least one alarm to be generated after termination of alarm group, together with termination of a currently generated alarm, when the alarm group termination is generated during sequential generation of the plurality of alarms.

3. The method of claim 1, wherein the setting of the at least one alarm group comprises:
   adding a new alarm to a corresponding alarm group when alarm group setting is selected in an alarm mode; and
   when an alarm sub-group of the corresponding alarm group is selected, adding a new alarm to the alarm sub-group and setting whether to delete the alarm sub-group upon selection of alarm group termination as an operation corresponding to alarm generation.

4. The method of claim 1, wherein the setting of the at least one alarm group comprises:
   displaying at least one separate alarm which is separately set in an alarm mode;
   when manual alarm group setting is selected, switching to a manual alarm group setting mode; and
   in the manual alarm group setting mode, setting at least one alarm selected from among the displayed at least one separate alarm as alarms of a corresponding alarm group or alarms of an alarm sub-group comprising the selected alarms.

5. The method of claim 1, wherein the setting of the at least one alarm group comprises:
   displaying at least one separate alarm which is separately set in an alarm mode;
   when automatic alarm group setting is selected, switching to an automatic alarm group setting mode;
   in the automatic alarm group setting mode, searching for information recorded in each of the displayed at least one separate alarm;
   searching for an alarm group corresponding to at least one character included in the recorded information; and
   automatically setting the alarm as an alarm of the alarm group corresponding to the at least one character included in the recorded information.

6. The method of claim 5, further comprising, when an alarm, which is not set as an alarm of the alarm group, exists among the displayed at least one separate alarm, manually setting the alarm in a corresponding alarm group or in a new alarm group.

7. The method of claim 1, further comprising, when the alarm group termination is selected during generation of an alarm in the terminal, terminating at least one alarm to be generated after generation of the alarm group termination among a plurality of alarms included in the alarm group, together with termination of the currently generated alarm.

8. The method of claim 7, wherein the terminating of the at least one alarm comprises:
when the alarm group termination is selected during generation of the alarm, determining whether an alarm sub-group exists in an alarm group including the generated alarm;
determining a termination setting of the alarm sub-group when the alarm sub-group exists; and
when a termination exception is set for the alarm sub-group, terminating all alarms of the alarm group except for alarms included in the alarm sub-group.

9. The method of claim 8, further comprising, when the alarm sub-group does not exist in the alarm group, terminating all alarms of an alarm group including the generated alarm.

10. The method of claim 8, further comprising, when the termination exception is not set for the alarm sub-group, terminating all alarms of an alarm group including the generated alarm.

11. The method of claim 7, further comprising:
when alarm termination is selected during generation of the alarm, terminating the generated alarm; and
when a snooze is selected during generation of the alarm, setting a snooze function of terminating the generated alarm and generating alarms a specified number of times at specified intervals.

12. The method of claim 7, further comprising:
when the alarm is terminated, determining a repetition period which is set for the terminated alarm;
when an alarm whose repetition period is set to occur one time exists among terminated alarms, moving the alarm to an one-time alarm group; and
when an alarm whose repetition period is set to occur multiple times exists among the terminated alarms, releasing the termination of the alarm on the next day.

13. A terminal comprising:
a controller configured to:
set at least one alarm group, each alarm group comprising a plurality of alarms and
set termination of the plurality of alarms to correspond to termination of the alarm group;
when the alarm group termination is selected during generation of an alarm in the terminal, determine whether an alarm sub-group exists in an alarm group including the generated alarm, and
when the alarm sub-group does not exist in the alarm group, terminate all alarms of an alarm group including the generated alarm.

14. The terminal of claim 13, wherein the controller is configured to automatically set termination of at least one alarm to be generated after generation of alarm group termination, together with termination of a currently generated alarm, when the alarm group termination is generated during sequential generation of the plurality of alarms.

15. The terminal of claim 13, wherein the controller is configured to add a new alarm to a corresponding alarm group when alarm group setting is selected in an alarm mode, and when an alarm sub-group of the corresponding alarm group is selected, add a new alarm to the alarm sub-group and set whether to delete the alarm sub-group upon selection of alarm group termination as an operation corresponding to alarm generation.

16. The terminal of claim 13, wherein the controller is configured to display at least one separate alarm which is separately set in an alarm mode, switch to a manual alarm group setting mode when manual alarm group setting is selected, and in the manual alarm group setting mode, set at least one alarm selected from among the displayed at least one separate alarm as alarms of a corresponding alarm group or alarms of an alarm sub-group comprising the selected alarms.

17. The terminal of claim 13, wherein the controller is configured to display at least one separate alarm which is separately set in an alarm mode, switch to an automatic alarm group setting mode when automatic alarm group setting is selected, search for information recorded in each of the displayed at least one separate alarms in the automatic alarm group setting mode, search for an alarm group corresponding to at least one character included in the recorded information, and automatically set the alarm as an alarm of the alarm group corresponding to the at least one character included in the recorded information.

18. The terminal of claim 17, wherein when an alarm, which is not set as an alarm of the alarm group, exists among the displayed at least one separate alarm, the controller is configured to manually set the alarm as an alarm of a corresponding alarm group or as an alarm of a new alarm group.

19. The terminal of claim 13, wherein when alarm group termination is selected during generation of an alarm in the terminal, the controller is configured to terminate at least one alarm to be generated after generation of the alarm group termination among a plurality of alarms included in the alarm group, together with termination of the currently generated alarm.

20. The terminal of claim 13, wherein the controller is configured to determine whether an alarm sub-group exists in an alarm group including the generated alarm when the alarm group termination is selected during generation of the alarm, determine termination setting of the alarm sub-group when the alarm sub-group exists, and terminate all alarms of the alarm group except for alarms included in the alarm sub-group when the termination exception is set for the alarm sub-group.

21. The terminal of claim 20, wherein when the alarm sub-group does not exist in the alarm group, the controller is configured to terminate all alarms of an alarm group including the generated alarm.

22. The terminal of claim 20, wherein when the termination exception is not set for the alarm sub-group, the controller is configured to terminate all alarms of an alarm group including the generated alarm.

23. The terminal of claim 13, wherein the controller is configured to terminate the generated alarm when alarm termination is selected during generation of the alarm, and set a snooze function for terminating the generated alarm and generating alarms a specified number of times at specified intervals when the snooze function is selected during generation of the alarm.

24. The terminal of claim 13, wherein the controller is configured to move one alarm whose repetition period is set to occur one time among the terminated alarms to a one-time alarm group and release the termination of another alarm whose repetition period is set to occur multiple times among the terminated alarms on the next day.

25. A non-transitory processor-readable recording medium having recorded thereon a program, that when executed by a processor, the program configured to perform at least the following:
set at least one of a plurality of alarm groups, each alarm group comprising a plurality of alarms and set termination of the plurality of alarms to correspond to termination of the alarm group;

when the alarm group termination is selected during generation of an alarm in the terminal, determine whether an alarm sub-group exists in an alarm group including the generated alarm; and when the alarm sub-group does not exist in the alarm group, terminate all alarms of an alarm group including the generated alarm.

* * * * *